United States Patent
Kusano et al.

(10) Patent No.: US 8,559,877 B2
(45) Date of Patent: Oct. 15, 2013

(54) RADIO COMMUNICATION DEVICE AND RADIO COMMUNICATION METHOD

(75) Inventors: Yoshimasa Kusano, Yokohama (JP); Taku Nakayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 318 days.

(21) Appl. No.: 13/001,593

(22) PCT Filed: Jun. 25, 2009

(86) PCT No.: PCT/JP2009/061631
§ 371 (c)(1),
(2), (4) Date: Dec. 27, 2010

(87) PCT Pub. No.: WO2009/157513
PCT Pub. Date: Dec. 30, 2009

(65) Prior Publication Data
US 2011/0105064 A1 May 5, 2011

(30) Foreign Application Priority Data
Jun. 27, 2008  (JP) .................... 2008-169628

(51) Int. Cl.
*H04B 7/00* (2006.01)
*H04B 1/38* (2006.01)

(52) U.S. Cl.
USPC ............... 455/59; 455/60; 455/61; 455/561; 455/562.1; 455/105

(58) Field of Classification Search
USPC .............. 455/59, 60, 61, 561, 562.1, 105
See application file for complete search history.

(56) References Cited

U.S. PATENT DOCUMENTS

| 7,574,236 B1* | 8/2009 | Mansour .................... 455/562.1 |
| 2002/0132600 A1 | 9/2002 | Rudrapatna |
| 2004/0009755 A1 | 1/2004 | Yoshida |
| 2007/0205959 A1 | 9/2007 | Nakaya et al. |
| 2007/0207837 A1 | 9/2007 | Nakaya |
| 2008/0009321 A1* | 1/2008 | Sayeed et al. ............... 455/562.1 |
| 2008/0089269 A1 | 4/2008 | Tsutsui |
| 2008/0108310 A1* | 5/2008 | Tong et al. ....................... 455/69 |

(Continued)

FOREIGN PATENT DOCUMENTS

| JP | 2002-291048 A | 4/2002 |
| JP | 2003-338781 A | 11/2003 |

(Continued)

OTHER PUBLICATIONS

Notification of Reasons for Refusal dated Jul. 31, 2012, issued in counterpart Japanese Application No. 2010-518054.

(Continued)

*Primary Examiner* — Wen Huang
(74) *Attorney, Agent, or Firm* — Procopio, Cory, Hargreaves & Savitch LLP

(57) ABSTRACT

A radio base station (100) is provided with a stream determination unit (141) for determining whether communication quality of a radio communication channel between the radio base station (100) and a receiving device is lower than a predetermined threshold, and an antenna selector (142) for selecting, from among transmitting antennas (131-134), transmitting antennas such that the distance between the transmitting antennas (131-134) becomes shorter than that before the communication quality is determined to be lower than the predetermined threshold when the communication quality is determined to be lower than the predetermined threshold.

11 Claims, 11 Drawing Sheets

(56) References Cited

U.S. PATENT DOCUMENTS

| | | |
|---|---|---|
| 2008/0285524 A1 | 11/2008 | Yokoyama |
| 2010/0135420 A1* | 6/2010 | Xu et al. .................. 375/260 |
| 2011/0064156 A1* | 3/2011 | Kim et al. ................. 375/267 |

FOREIGN PATENT DOCUMENTS

| | | |
|---|---|---|
| JP | 2005-136492 A | 5/2005 |
| JP | 2006-141013 A | 6/2006 |
| JP | 2007-235761 A | 9/2007 |
| JP | 2007-235762 A | 9/2007 |
| JP | 2008-278076 A | 11/2008 |
| WO | 2006/123418 A1 | 11/2006 |
| WO | 2007/091317 A1 | 8/2007 |
| WO | 2007-091988 A2 | 8/2007 |

OTHER PUBLICATIONS

International Search Report and Written Opinion dated Aug. 18, 2009 issued by the Japanese Patent Office for International Application No. PCT/JP2009/061631.

* cited by examiner

FIG. 1
(a)
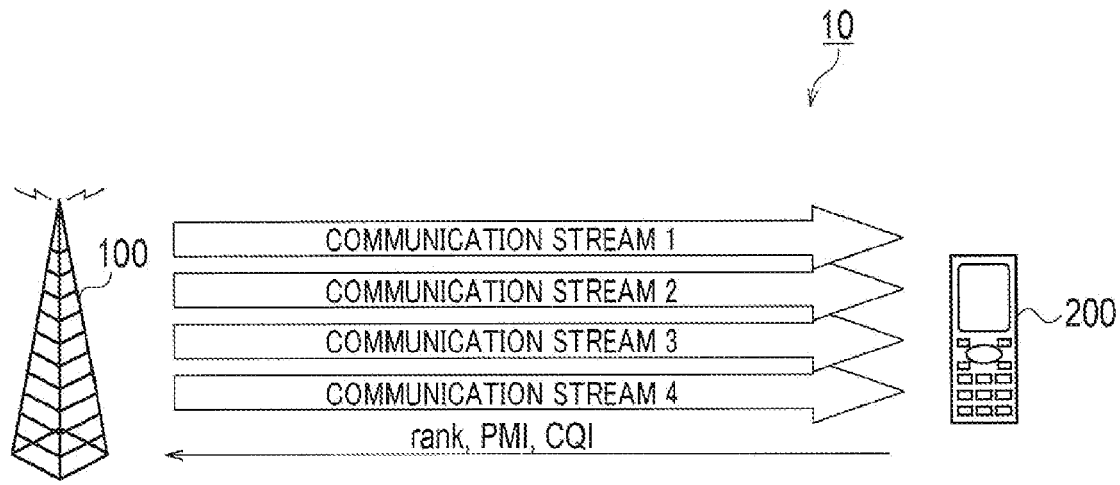
(b)
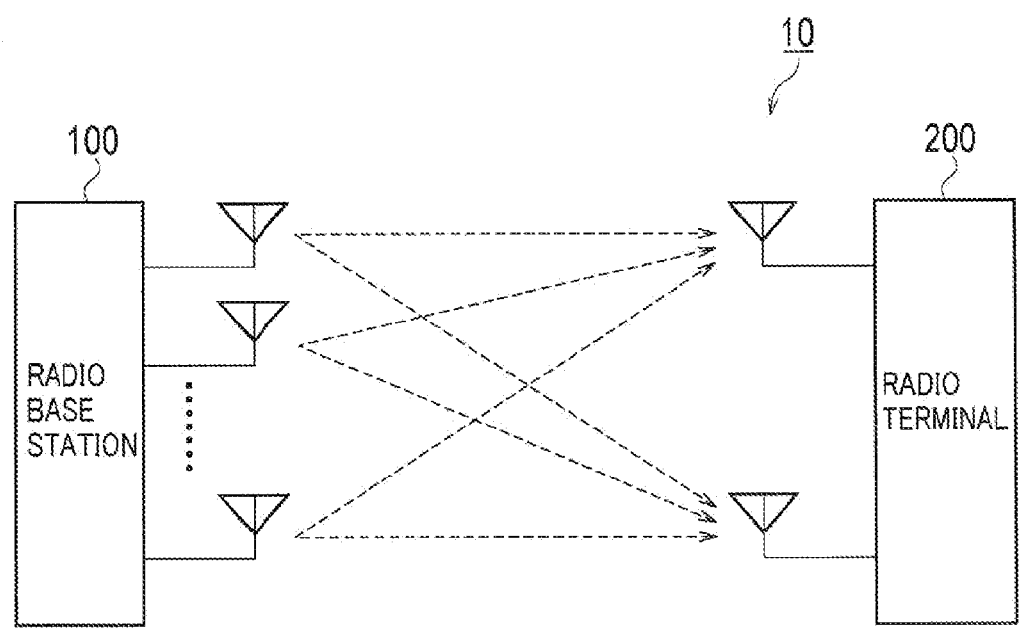

FIG. 4
(a)
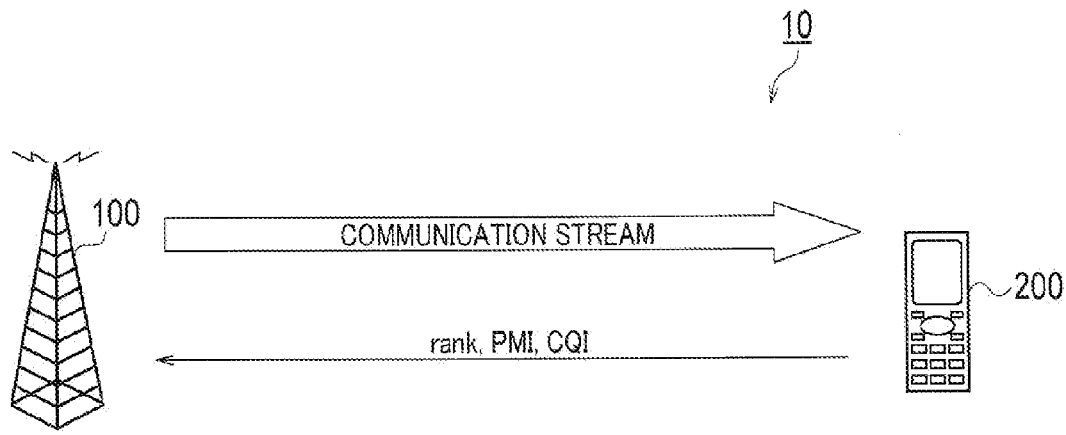
(b)
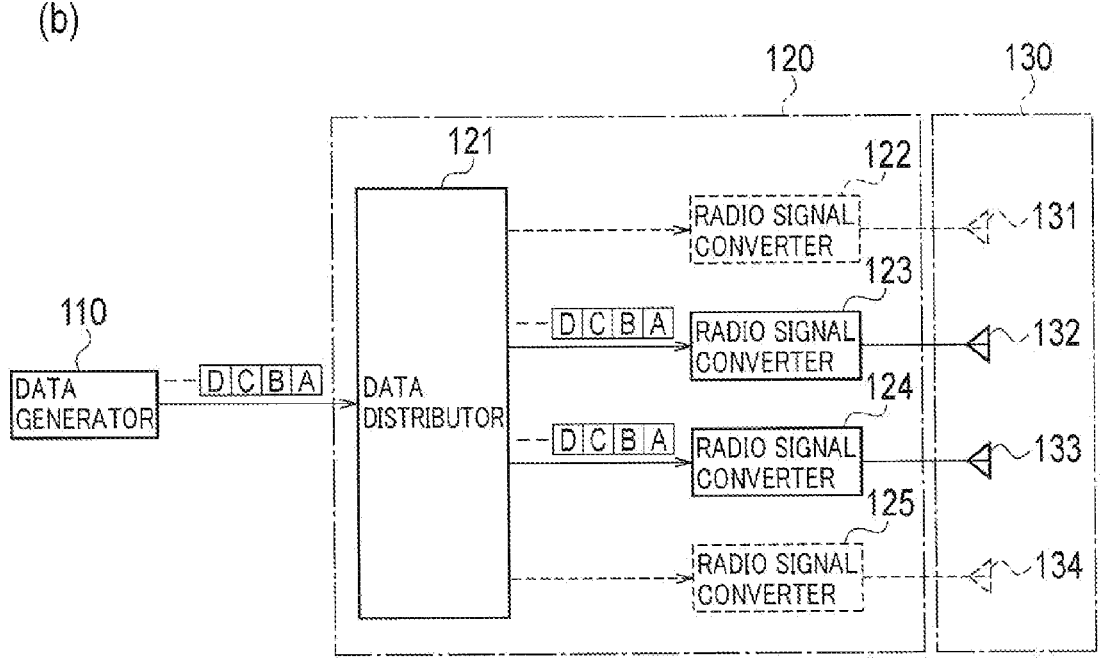

FIG. 5
(a)
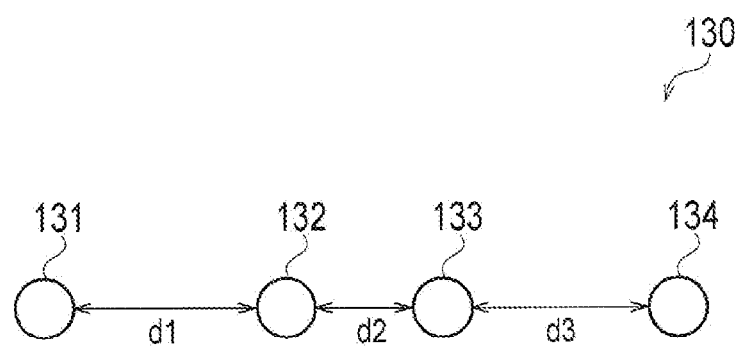
(b)
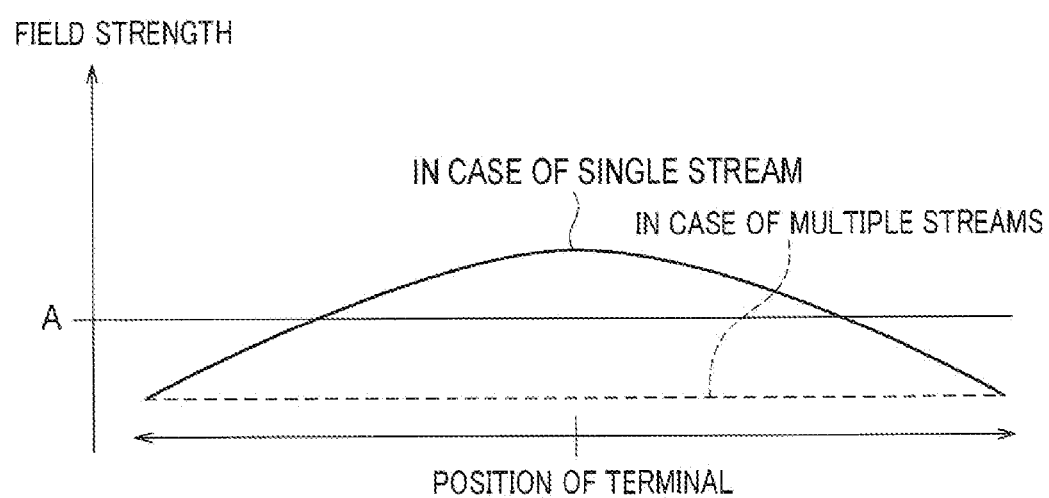

FIG. 10
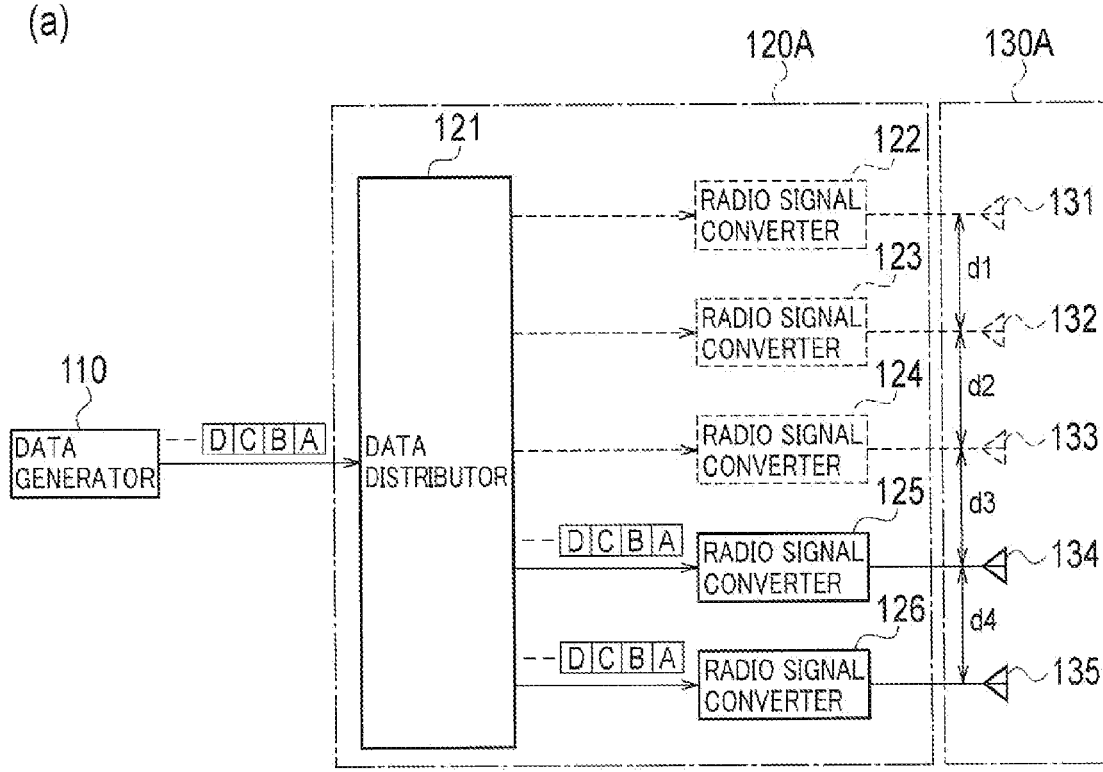
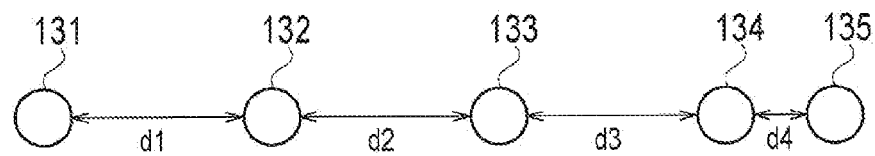

FIG. 11
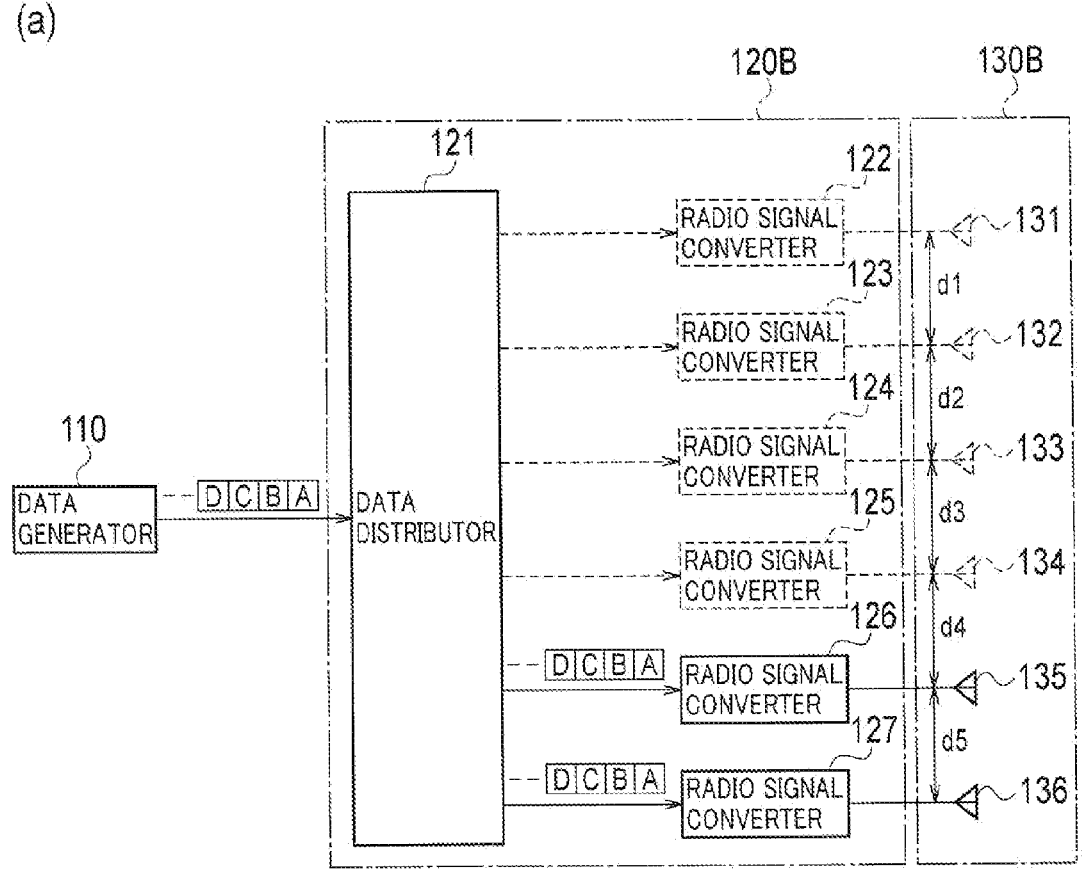
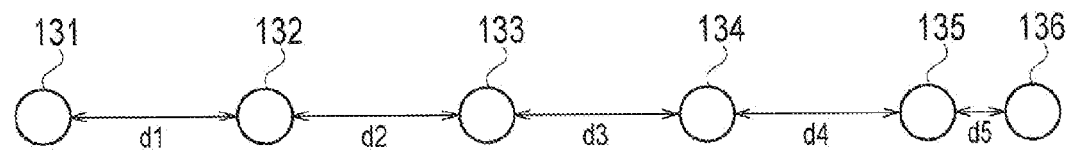

RADIO COMMUNICATION DEVICE AND RADIO COMMUNICATION METHOD

TECHNICAL FIELD

The present invention relates to a radio communication device and a radio communication method for simultaneously transmitting multiple communication data series using the same frequency band to a receiving device through multiple transmitting antennas.

BACKGROUND ART

Recently, various multiplexing techniques have been implemented for radio communication systems to more effectively utilize a limited frequency band. For example, a multiple input multiple output (MIMO) radio communication system is known in which multiple communication data series using the same frequency band are simultaneously transmitted through multiple transmitting antennas, and in which the multiple communication data series are received through multiple receiving antennas and then are separated into individual communication data series (for example, Patent Document 1).

In such a radio communication system, the distance between the antennas is generally set to be much longer (for example, not less than $4\lambda$) than the wavelength of the frequency in use in order to improve separation of communication data series in a receiving device by producing diversity effect from the arranged positions of the antennas.

PRIOR ART DOCUMENT

Patent Document

Patent Document 1: Japanese Patent Application Publication No. 2006-141013 (p. 14, FIG. 1)

DISCLOSURE OF THE INVENTION

In a multiple input multiple output radio communication system, when the communication quality (for example, SNR) degrades below a predetermined threshold, the receiving device may choose to use a single communication data series to maintain communication with the transmitting device as long as possible rather than to increase the communication speed by using multiple communication data series. The transmitting device transmits only a single communication data series on the basis of feedback information transmitted from the receiving device. To put it differently, in this case, improving separation of multiple communication data series with the diversity effect is no longer involved, or communication speed, which would be increased by simultaneous transmission of multiple communication data series, cannot be increased any more.

The present invention has been made in view of the above situation and an objective thereof is to provide a radio communication device and a radio communication method with which, even in the case where the communication quality degrades below a predetermined threshold, faster and stable communication can be maintained in a multiple input multiple output radio communication system capable of simultaneously transmitting multiple communication data series using the same frequency band through multiple transmitting antennas.

The present invention has the following characteristics to solve the problems described above. First of all, a first characteristic of the present invention is summarized as a radio communication device (radio base station 100) that includes a radio communication unit (radio communication unit 120) transmitting simultaneously a plurality of communication data series using a same frequency band to a receiving device (radio terminal 200) through a transmitting antenna unit (transmitting antenna unit 130) including a plurality of transmitting antennas (transmitting antennas 131 to 134), comprising: an antenna selector (antenna selector 142) configured to perform antenna selection processing when a communication quality degrades below a predetermined threshold in a radio communication channel between the radio communication device and the receiving device receiving simultaneously the plurality of communication data series and separating the plurality of communication data series into individual communication data series, the antenna selection processing performed by selecting, from among the plurality of transmitting antennas forming the transmitting antenna unit, such transmitting antennas that a distance between the transmitting antennas is shorter than before the communication quality degrades below the predetermined threshold, wherein the radio communication unit transmits the communication data series through the transmitting antennas selected by the antenna selector.

In such a radio communication device, if the communication quality degrades below the predetermined threshold, the antenna selector selects, from among the transmitting antennas forming the transmitting antenna unit, such transmitting antenna that the antenna distance would be shorter than before the communication quality degrades below the predetermined threshold.

Accordingly, the correlation between the transmitting antennas becomes higher after the communication quality degrades below the predetermined threshold. As a result, the beam forming effect rather than the diversity effect becomes higher and thus the communication quality can be improved. In other words, with the radio communication device according to the first feature, faster and stable communication can be maintained in the multiple input multiple output radio communication system even if the communication quality degrades below the predetermined threshold.

A second characteristic of the present invention is summarized as the radio communication device according to the first characteristic, wherein the antenna selector determines the distance between the transmitting antennas of the plurality of transmitting antennas forming the transmitting antenna unit, in such a way that the distance widens a region where a predetermined field strength is obtained at a position of the receiving device, and the antenna selector performs the antenna selection processing on the basis of the determined distance between the transmitting antennas.

A third characteristic of the present invention is summarized as the radio communication device according to the first characteristic, wherein, when the communication quality degrades below the predetermined threshold, the antenna selector selects, from among the plurality of transmitting antennas forming the transmitting antenna unit, the transmitting antennas such that the distance between the transmitting antennas is not longer than a predetermined wavelength corresponding to the frequency band.

A fourth characteristic of the present invention is summarized as the radio communication device according to the third characteristic, wherein the antenna selector selects the transmitting antennas with which the distance between the transmitting antennas is not longer than $1\lambda$ where the wavelength of the frequency band is defined as $1\lambda$.

A fifth characteristic of the present invention is summarized as the radio communication device according to the third characteristic, wherein: the transmitting antenna unit includes a short distance antenna group (transmitting antennas 132 and 133) including a plurality of transmitting antennas arranged with a distance (distance d2) therebetween not longer than the predetermined wavelength; among the plurality of transmitting antennas forming the transmitting antenna unit, transmitting antennas (transmitting antennas 131 and 134) different from the short distance antenna group have a longer distance (distance d1+d2+d3) therebetween than the predetermined wavelength, and each have a longer distance (distance d1 or d3) to the short distance antenna group than the predetermined wavelength; and the antenna selector selects the short distance antenna group when the communication quality degrades below the predetermined threshold.

A sixth characteristic of the present invention is summarized as the radio communication device according to the third characteristic, wherein: the plurality of transmitting antennas forming the transmitting antenna unit includes: an auxiliary transmitting antenna (auxiliary transmitting antenna 135) that is not used for the transmission of the communication data series until the communication quality is determined to have degraded below the predetermined threshold; and a specific transmitting antenna (transmitting antenna 134) whose distance (distance d4) to the auxiliary transmitting antenna is not longer than the predetermined wavelength, wherein among the plurality of transmitting antennas forming the transmitting antenna unit, the transmitting antennas (transmitting antennas 131 to 134) except for the auxiliary transmitting antenna has a longer distance (distance d1, d2, or d3) therebetween than the predetermined wavelength, and the antenna selector selects the auxiliary transmitting antenna and the specific transmitting antenna when the communication quality degrades below the predetermined threshold.

A seventh characteristic of the present invention is summarized as the radio communication device according to the third characteristic, wherein the plurality of transmitting antennas forming the transmitting antenna unit include a plurality of auxiliary transmitting antennas (auxiliary transmitting antennas 135 and 136) that are not used for the transmission of the communication data series until the communication quality is determined to have degraded below the predetermined threshold, a distance (distance d5) between the plurality of auxiliary transmitting antennas is not longer than the predetermined wavelength, among the plurality of transmitting antennas forming the transmitting antenna unit, transmitting antennas (transmitting antennas 131 to 134) different from the auxiliary transmitting antennas have a longer distance (distance d1, d2, or d3) therebetween than the predetermined wavelength and each have a longer distance (distance d4) to each of the auxiliary transmitting antennas than the predetermined wavelength, and the antenna selector selects the plurality of auxiliary transmitting antennas when the communication quality degrades below the predetermined threshold.

An eighth characteristic of the present invention is summarized as the radio communication device according to the first to seventh characteristic, wherein the antenna selector performs the antenna selection processing when the radio communication unit is transmitting the communication data series one at a time.

A ninth characteristic of the present invention is summarized as the radio communication device according to the eighth characteristic, further comprising: a weight determination unit (antenna weight determination unit 143) configured to determine a transmitting antenna weight for each of the plurality of transmitting antennas, the transmitting antenna weight assigned to the communication data series, wherein the weight determination unit determines the transmitting antenna weight for each of the plurality of transmitting antennas such that the communication quality is improved.

A tenth characteristic of the present invention is summarized as a radio communication device (radio base station 100) that includes a radio communication unit (radio communication unit 120) capable of transmitting simultaneously a plurality of communication data series using a same frequency band to a receiving device (radio terminal 200) through a transmitting antenna unit (transmitting antenna unit 130) including a plurality of transmitting antennas (transmitting antennas 131 to 134), comprising: an antenna selector (antenna selector 142) configured to perform antenna selection processing when the number of communication data series transmitted from the radio communication unit to the receiving device decreases to a predetermined number or below, the antenna selection processing performed by selecting, from the plurality of transmitting antennas forming the transmitting antenna unit, such transmitting antennas that a distance between the transmitting antennas is shorter than before the number of communication data series decreases to the predetermined number or below, the receiving device being capable of receiving simultaneously the plurality of communication data series and separating the plurality of communication data series into individual communication data series, wherein the radio communication unit transmits the communication data series through the transmitting antennas selected by the antenna selector.

An eleventh characteristic of the present invention is summarized as a radio communication method that uses a radio communication unit transmitting simultaneously a plurality of communication data series using a same frequency band to a receiving device through a transmitting antenna unit including a plurality of transmitting antennas, comprising the steps of: when a communication quality degrades below a predetermined threshold in a radio communication channel between the radio communication unit and the receiving device receiving simultaneously the plurality of communication data series and separating the plurality of communication data series into individual communication data series, selecting (Step S102), from among the plurality of transmitting antennas forming the transmitting antenna unit, such transmitting antennas that a distance between the transmitting antennas is shorter than before the communication quality degrades below the predetermined threshold; and transmitting, from the radio communication unit, the communication data series through the transmitting antennas selected by the step of selecting.

A twelfth characteristic of the present invention is summarized as a radio communication method that uses a radio communication unit capable of transmitting simultaneously a plurality of communication data series using a same frequency band to a receiving device through a transmitting antenna unit including a plurality of transmitting antennas, comprising the steps of: when the number of communication data series transmitted from the radio communication unit to the receiving device decreases to a predetermined number or below, selecting, from among the plurality of transmitting antennas forming the transmitting antenna unit, such transmitting antennas that a distance between the transmitting antennas is shorter than before the number of communication data series decreases to the predetermined number or below, the receiving device being capable of receiving simultaneously the plurality of communication data series and separating the plurality of communication data series into individual communication data series; and transmitting, from the radio communication unit, the communication data series through the transmitting antennas selected by the step of selecting.

According to the features of the present invention, a radio communication device and a radio communication method can be provided with which, even when the communication quality degrades below a predetermined threshold, faster and stable communication can be maintained in a multiple input multiple output radio communication system in which multiple communication data series using the same frequency band can be simultaneously transmitted using multiple transmitting antennas.

BRIEF DESCRIPTION OF THE DRAWINGS

FIG. 1 is a schematic configuration diagram of a radio communication system according to a first embodiment of the present invention.

FIG. 4 is a (first) diagram for explaining antenna selection processing according to the first embodiment of the present invention.

FIG. 5 is a (second) diagram for explaining the antenna selection processing according to the first embodiment of the present invention.

FIG. 10 is a block diagram showing a configuration of a radio base station according to a second embodiment of the present invention.

FIG. 11 is a block diagram showing a configuration of a radio base station according to a third embodiment of the present invention.

BEST MODES FOR CARRYING OUT THE INVENTION

Figure 2:
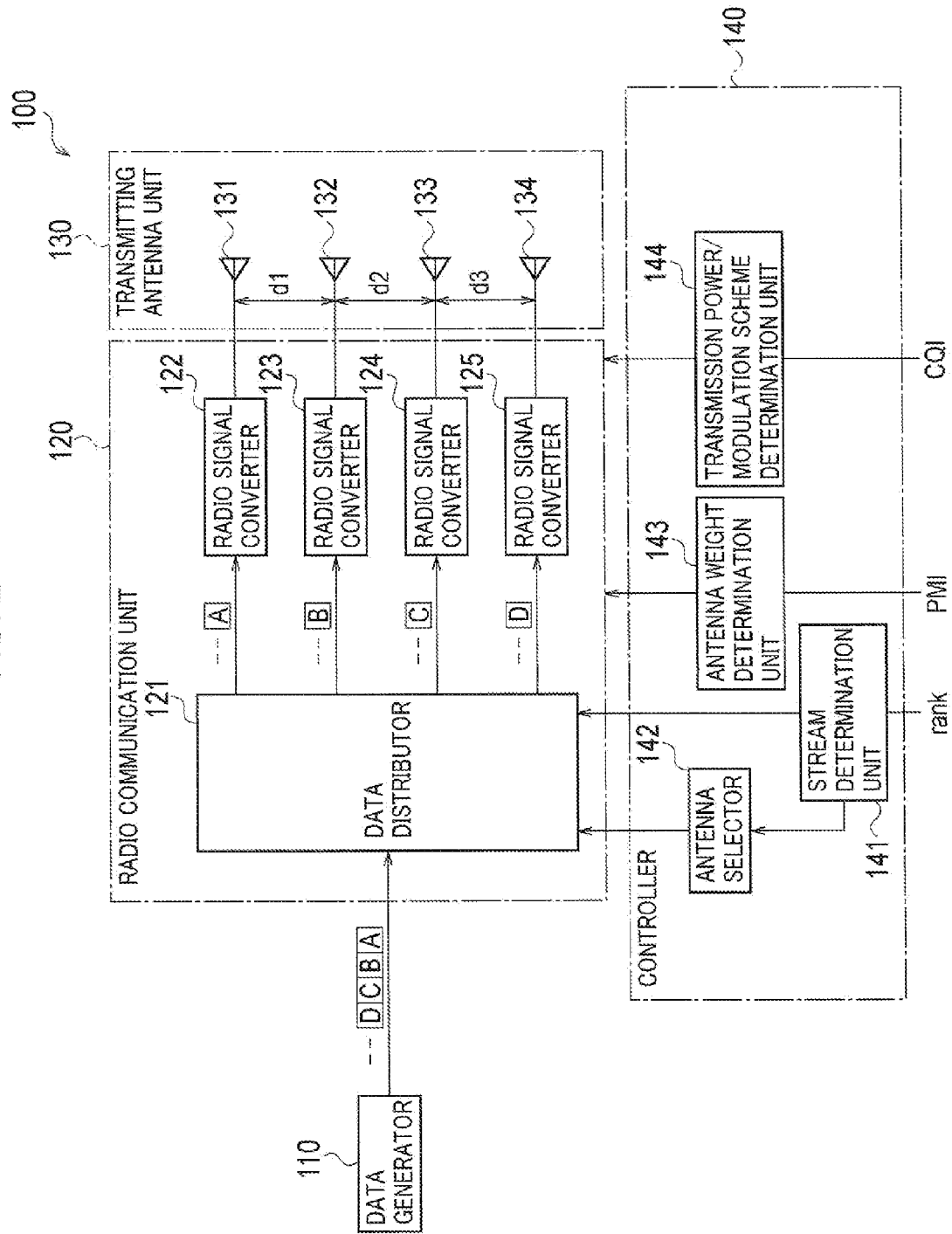
FIG. 2 is a block diagram showing a configuration of a radio base station according to the first embodiment of the present invention.

Next, embodiments of the present invention will be described. Note that, in the following description of the drawings, same or similar reference signs denote same or similar elements and portions. In addition, it should be noted that the drawings are schematic and ratios of dimensions and the like are different from actual ones.

First Embodiment

In a first embodiment, descriptions are given of (1) a schematic configuration of a radio communication system, (2) a detailed configuration of the radio communication system, (3) antenna selection processing, (4) a transmission parameter determination operation, (5) verification results, and (6) operations and effects.

(1) Schematic Configuration of Radio Communication System

FIGS. 1(a) and 1(b) are schematic configuration diagrams of a radio communication system 10 according to the first embodiment. The radio communication system 10 includes a radio base station 100 and a radio terminal 200.

The radio terminal 200 is located within a communication area of the radio communication system 100 and performs radio communication with the radio base station 100. In the first embodiment, the description is given mainly of a downlink communication (direction from the radio base station 100 to the radio terminal 200).

As shown in FIGS. 1(a) and 1(b), the radio base station 100 configures a radio communication device that simultaneously transmits multiple communication streams (communication data series) using the same frequency band through multiple transmitting antennas. The radio terminal 200 configures a receiving device that receives multiple communication streams through multiple receiving antennas and separates the multiple communication streams into individual communication streams.

Accordingly, the radio communication system 10 is a multiple input multiple output (MIMO) radio communication system (hereinafter, referred to as "MIMO communication system" as appropriate). In the first embodiment, as illustrated in FIG. 1(a), the maximum number of communication streams is four, the radio base station 100 is provided with four transmitting antennas (see FIG. 2), and the radio terminal 200 is provided with two receiving antennas (see FIG. 3). Thus, the description is given with a 4×2 antenna configuration as an example.

The radio terminal 200 analyzes communication streams received from the radio base station 100 and generates feedback information used for adaptively controlling multiple-antenna transmission of the radio base station 100. A MIMO communication system in which feedback information is fed back is called a closed-loop MIMO communication system. The feedback information includes "rank," "PMI (Precoding Matrix Index)," and "CQI (Channel Quality Indicator)."

The rank is control information used for controlling the number of communication streams. The PMI is control information used for controlling transmitting antenna weights. The CQI is reception quality information used for controlling transmission power and modulation scheme.

The radio terminal 200 determines the number of communication streams and transmits a rank to the radio base station 100 through an uplink radio line. At the same time, the radio terminal 200 calculates transmitting antenna weights providing the maximum reception SNR in accordance with the number of communication streams and transmits a PMI that is based on the result of the calculation to the radio base station 100. Furthermore, the radio terminal 200 obtains a CQI on the basis of the reception SNR and transmits the CQI to the radio base station 100 through the uplink radio line.

The radio base station 100 determines: the number of downlink communication streams; transmitting antenna weights; and output power and modulation scheme respectively on the basis of the rank, the PMI, and the CQI transmitted from the radio terminal 200, so as to implement adaptive multiple transmitting antenna control. The number of transmitting antennas used for transmitting multiple communication streams is the total number of transmitting antennas belonging to the radio base station 100.

The radio base station 100 and the radio terminal 200 perform such control that the rank is lowered as communication quality such as reception SNR degrades and the rank is raised as the communication quality improves. Accordingly, communication using multiple communication streams is performed if a predetermined level of reception SNR is secured and multiple communication streams are not used if the reception SNR is low.

Meanwhile, in the closed-loop MIMO communication system, the radio terminal 200 calculates transmitting antenna weights and transmits a PMI to the radio base station 100 as the result of the calculation. Therefore, transmission diversity effect by the transmitting antenna weights is reduced if a large difference exists in downlink propagation path characteristics between the time when the transmitting antenna weights are calculated and the time when the radio base station 100 actually performs the transmission using the transmitting antenna weights determined based on the PMI. Thus, the communication quality significantly degrades. The diversity effect is an effect which improves the communication quality (for example, reception SNR) by allowing the receiver side to combine or select multiple communication streams having passed through multiple paths in a radio propagation environment where multi-path propagation occurs (see, FIG. 1(*b*)).

Degradation of communication quality may occur even when the number of communication streams is limited with adaptive controlling of the rank as described above. High speed movement of the radio terminal 200 in the communication area of the radio base station 100 creates a typical situation in which propagation path characteristics largely change. In such a high-speed movement situation, the radio propagation characteristics change momentarily to fluctuate the state of multiple paths. Thus, the diversity effect by the transmitting antenna weights cannot be expected at all.

Accordingly, in the first embodiment, a configuration is described in which, through appropriate selection of the transmitting antennas, faster and stable communication is maintained in the situation where the diversity effect cannot be expected at all.

(2) Detailed Configuration of Radio Communication System

Next, a detailed configuration of the radio communication system 10 is described. Specifically, descriptions are given of (2.1) a configuration of the radio base station and (2.2) a configuration of the radio terminal in this order. Note that configurations related to the present invention are mainly described below.

(2.1) Configuration of Radio Base Station

FIG. 2 is a block diagram showing a configuration of the radio base station 100.

As illustrated in FIG. 2, the radio base station 100 includes a data generator 110, a radio communication unit 120, a transmitting antenna unit 130, and a controller 140. FIG. 2 exemplarily illustrates a state where multiple communication streams are transmitted.

The data generator 110 generates data series to be transmitted to the radio terminal 200. The radio communication unit 120 converts the data series generated by the data generator 110 into multiple communication streams and into a radio frequency band (system frequency band). In this event, the multiple communication streams are converted into the same frequency band. The transmitting antenna unit 130 performs transmission of the multiple communication streams each converted into the radio frequency band.

The radio communication unit 120 includes a data distributor 121 and four radio signal converters (a radio signal converter 122, a radio signal converter 123, a radio signal converter 124, and a radio signal converter 125).

The data distributor 121 is controlled by the controller 140 to distribute data series generated by the data generator 110 to the radio signal converters 122 to 125. Specifically, the data distributor 121 performs serial/parallel conversion on the data series generated by the data generator 110 to generate four communication streams to allow parallel data transfer. The data distributor 121 outputs the data series generated by the data generator 110 without performing the serial/parallel conversion thereon if transmission of only a single communication stream is instructed by the controller 140.

The radio signal converter 122 includes an up converter, a power amplifier, and the like and converts a communication stream received from the data distributor 121 into a radio frequency band. At that point, the radio signal converter 122 weights the communication stream on the basis of a transmitting antenna weight with a weighting mechanism provided therein. The transmitting antenna weight, which is received from the controller 140, is used for adjusting the phase and the amplitude of the communication stream.

The power amplifier in the radio signal converter 122 receives from the controller 140 an instruction on transmission power for the communication stream converted into to the radio frequency band. Operations of the radio signal converter 123, the radio signal converter 124, and the radio signal converter 125 are same as that of the radio signal converter 122.

The transmitting antenna unit 130 includes four transmitting antennas (a transmitting antenna 131, a transmitting antenna 132, a transmitting antenna 133, and a transmitting antenna 134) linearly arranged (linear arrangement) with predetermined distances therebetween.

The transmitting antennas 131 to 134 are connected to the radio signal converters 122 to 125, respectively. The transmitting antenna 131 and the transmitting antenna 132 are arranged with a distance d1 therebetween. The transmitting antenna 132 and the transmitting antenna 133 are arranged with a distance d2 therebetween. The transmitting antenna 133 and the transmitting antenna 134 are arranged with a distance d3 therebetween.

In the present embodiment, the transmitting antennas 131 to 134 are so arranged that the distance d2 between the transmitting antenna 132 and the transmitting antenna 133 is shorter than the distances d1 and d3 between the transmitting antenna 131 and the transmitting antenna 132 and between the transmitting antenna 133 and the transmitting antenna 134. The distance d1 and the distance d3 are substantially the same.

The controller 140 determines transmission parameters, i.e., transmitting antennas, transmitting antenna weights, transmission power, and modulation scheme on the basis of feedback information from the radio terminal 200. The controller 140 includes a stream determination unit 141, an antenna selector 142, an antenna weight determination unit 143, and a transmission power/modulation scheme determination unit 144.

The stream determination unit 141 receives a rank fed back from the radio terminal 200. Based on the rank, the stream determination unit 141 determines whether or not the number of communication streams is one. The number of communication streams being one means that a communication quality such as reception SNR in the radio terminal 200 has degraded below a predetermined threshold.

Accordingly, in this embodiment, the stream determination unit 141 serves as a determination unit that determines whether or not the communication quality in a radio communication channel between the radio base station 100 and the radio terminal 200 has degraded below a predetermined threshold. The stream determination unit 141 controls the data distributor 121 on the basis of the result of the rank determination.

The antenna selector 142 selects transmitting antennas to be used for communication stream transmission from among the transmitting antennas 131 to 134. The antenna selector 142 sets the number of transmitting antennas to four if the rank is not 1, that is, if the communication quality has not degraded below the predetermined threshold. On the other hand, the antenna selector 142 sets the number of transmitting antennas to two if the rank is 1, that is, if the communication quality is determined to have degraded below the predetermined threshold.

The antenna selector 142 performs antenna selection processing in which the transmitting antennas 132 and 133 are selected from among the transmitting antennas 131 to 134 so that the distance between the transmitting antennas would be shorter than before the communication quality is determined to have degraded below the predetermined threshold. Details of this antenna selection processing will be described later.

The antenna weight determination unit 143 receives a PMI fed back from the radio terminal 200. The antenna weight determination unit 143 determines transmitting antenna weights on the basis of the PMI and outputs the transmitting antenna weights to the radio signal converters 122 to 125.

The transmission power/modulation scheme determination unit 144 receives a CQI fed back from the radio terminal 200. The transmission power/modulation scheme determination unit 144 determines transmission power and modulation scheme on the basis of the CQI and controls the radio signal converters 122 to 125 on the basis of the determination result.

(2.2) Configuration of Radio Terminal

Figure 3:
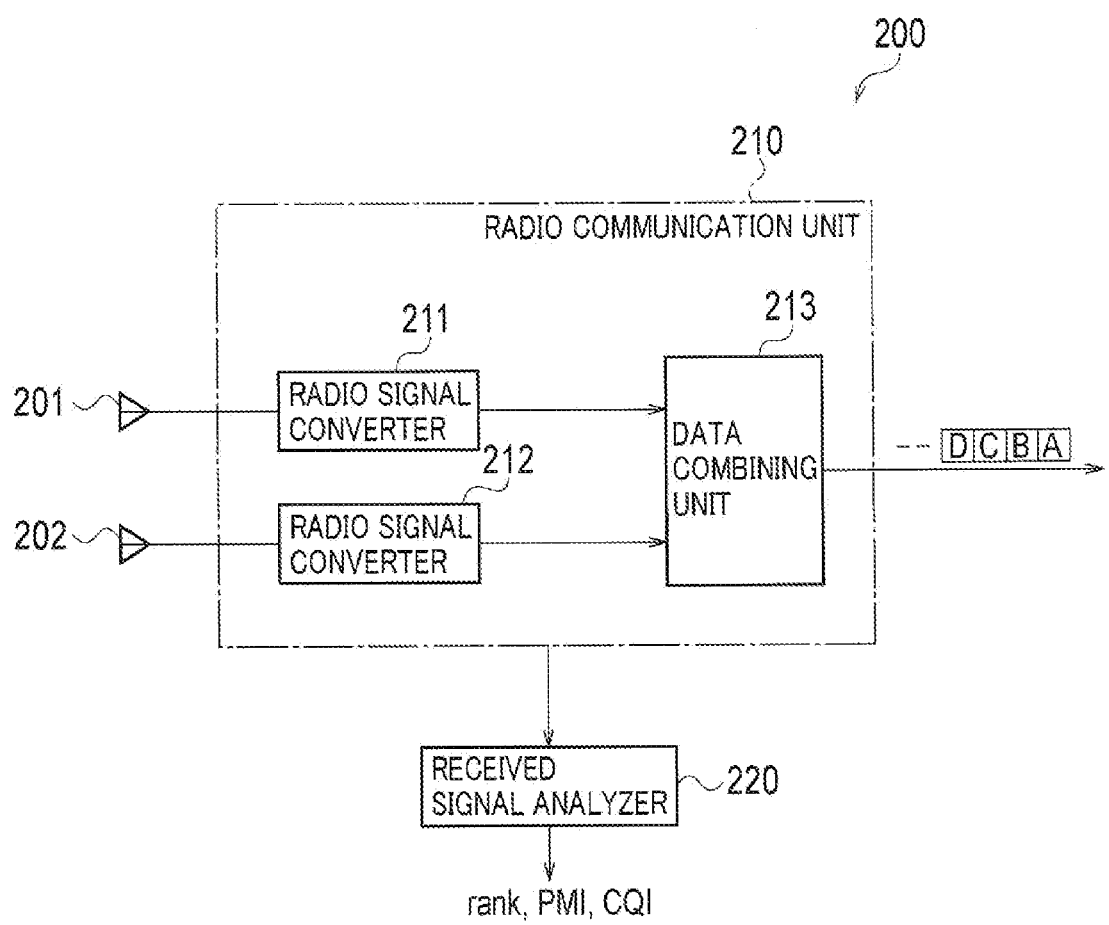
FIG. 3 is a block diagram showing a configuration of a radio terminal according to the first embodiment of the present invention.

FIG. 3 is a block diagram showing a configuration of the radio terminal 200.

As illustrated in FIG. 3, the radio terminal 200 includes two receiving antennas (a receiving antenna 201 and a receiving antenna 202), a radio communication unit 210, and a received signal analyzer 220. The radio communication unit 210 includes a radio signal converter 211, a radio signal converter 212, and a data combining unit 213.

The radio signal converter 211 includes a low-noise amplifier, a down converter, and the like and amplifies and down converts a received signal received by the receiving antenna 201. In the multiple communication stream transmission, the radio signal converter 211 outputs multiple communication streams having interfered with each other in a radio communication section. An operation of the radio signal converter 212 is same as that of the radio signal converter 211.

In the single communication stream transmission, the communication stream outputted from the radio signal converter 211 is substantially the same as the communication stream outputted from the radio signal converter 212. The data combining unit 213 combines the communication streams respectively outputted from the radio signal converters 211 and 212.

The received signal analyzer 220 analyzes the received signal and determines the number of communication streams (rank) suitable for the propagation path characteristics. The received signal analyzer 220 fixes the number of transmitting antennas to two if the rank is 1, but imposes no limit on the number of transmitting antennas if the rank is 2 or more. The received signal analyzer 220 estimates transmitting antenna weights corresponding to the number of transmitting antennas and determines the PMI on the basis of the estimation result. The received signal analyzer 220 also determines the CQI on the basis of an SNR measured at the point of reception and then transmits the rank, the PMI, and the CQI to the radio base station 100 through an uplink radio line.

(3) Antenna Selection Processing

Antenna selection processing is described using FIGS. 4 and 5.

FIG. 4(*a*) illustrates a case where a single communication stream is transmitted from the radio base station 100 to the radio terminal 200. In this case, as shown in FIG. 4(*b*), the transmitting antennas 132 and 133 are used for the communication stream transmission and the transmitting antennas 131 and 134 are not used for the communication stream transmission. Accordingly, MIMO communication is performed in the radio communication system 10 with two transmitting antennas, two receiving antennas, and a single communication stream.

As illustrated in FIG. 4(*b*), the radio signal converter 123, which is connected to the transmitting antenna 132, receives a communication stream similar to the data generated by the data generator 110. The radio signal converter 124, which is connected to the transmitting antenna 133, receives the communication stream same as the communication stream received by the radio signal converter 123.

As described above, in the single communication stream transmission, the transmitting antennas 131 and 134 which are arranged at outer sides among the transmitting antennas 131 to 134 are not used. Thus, only the transmitting antenna 132 and the transmitting antenna 133 which are arranged at inner sides and neighboring each other are used. As illustrated in FIG. 5(*a*), the distance d2 between the transmitting antenna 132 and the transmitting antenna 133 is set to be short. In this embodiment, the transmitting antenna 132 and the transmitting antenna 133 configure a short distance antenna group (short distance antenna pair).

In the single communication stream transmission, only the transmitting antenna 132 and the transmitting antenna 133 are used between which the antenna distance is short. Combination gains at the edges of the antennas of the radio terminal 200 are secured by beam forming effect. The beam forming effect is an effect in which electric waves from multiple transmitting antennas are subjected to spatial combining and the directivity (a region where the field strength is strong) is directed to the receiver side so that the gain on the receiver side is increased.

Therefore, the region where a predetermined field strength A can be obtained at the position of the radio terminal 200 can be widened as illustrated in FIG. 5(*b*) by using only the transmitting antenna 132 and the transmitting antenna 133 between which the antenna distance is short. In the multiple communication stream transmission, the field strength is fixed regardless of the position of the radio terminal 200.

In the present embodiment, the distance d2 between the transmitting antenna 132 and the transmitting antenna 133 is not longer than 1λ (predetermined wavelength), where 1λ is the wavelength of the frequency band used for the communication stream transmission. The beam forming effect, which is eminent if the distance d2 is not longer than 1λ, can still be obtained even if the distance d2 is somewhat longer than 1λ.

Meanwhile, as illustrated in FIG. 5(*a*), the distance d1 between the transmitting antenna 131 and the transmitting antenna 132 and the distance d3 between the transmitting antenna 133 and the transmitting antenna 134 are set to be approximately 4λ for a higher transmission diversity effect. Thus, the distance d1 (4λ) between the transmitting antenna 131 and the transmitting antenna 132, the distance d3 (4λ) between the transmitting antenna 133 and the transmitting antenna 134, and the distance (d1+d2+d3) between the transmitting antenna 131 and the transmitting antenna 134 are each longer than the distance d2.

(4) Transmission Parameter Determination Operation

Figure 6:
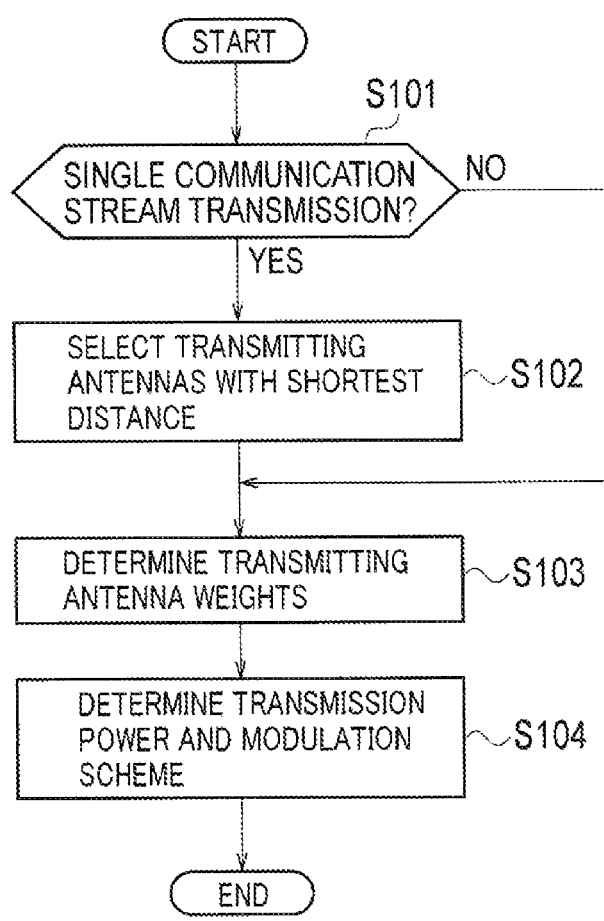
FIG. 6 is a flowchart showing a transmission parameter determination operation performed in the radio base station according to the first embodiment of the present invention.

FIG. 6 is a flowchart showing a transmission parameter determination operation performed in the radio base station 100.

At Step S101, the stream determination unit 141 determines whether or not the number of communication streams is one on the basis of a rank fed back from the radio terminal 200. If the number of communication streams is determined as one, the process proceeds to Step S102. If the number of communication streams is determined as more than one, the process proceeds to Step S103.

At Step S102, the antenna selector 142 selects the transmitting antennas 132 and 133 between which the distance is the shortest as transmitting antennas to be used for the single communication stream transmission.

At Step S103, the antenna weight determination unit 143 determines the transmitting antenna weights on the basis of a PMI fed back from the radio terminal 200.

At Step S104, the transmission power/modulation scheme determination unit 144 determines the transmission power and the modulation scheme on the basis of a CQI fed back from the radio terminal 200.

(5) Verification Result

Next, an advantageous effect which the present embodiment provides is described with reference to verification results obtained through simulation.

Figure 7:
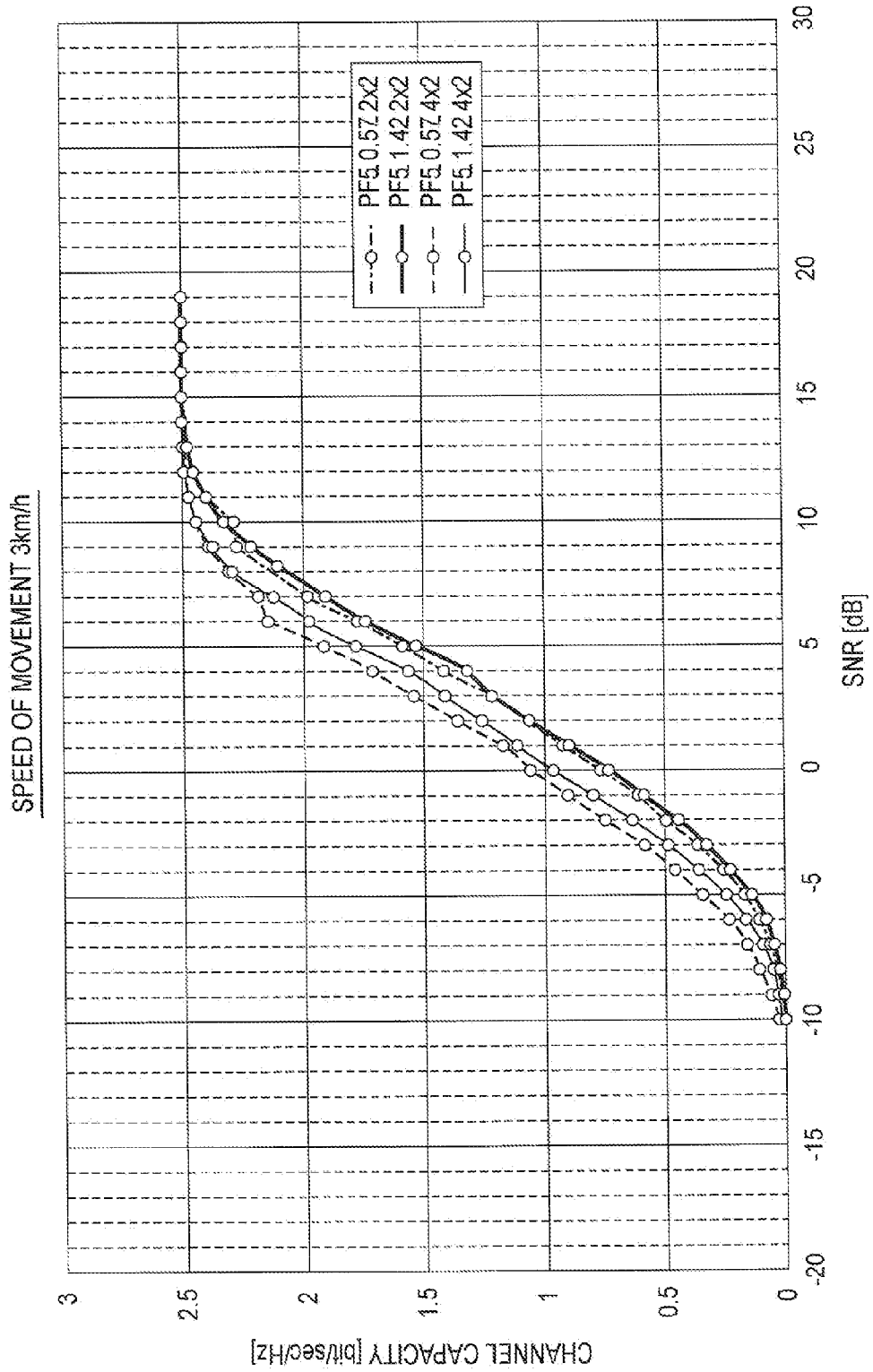
FIG. 7 is a (first) diagram for explaining an advantageous effect which the first embodiment of the present invention provides.

FIG. 7 shows frequency effective efficiency characteristics in cases where the MIMO antenna configurations are set to be 4×2 and 2×2 and the distance between the neighboring antennas are set to be 4λ and 10λ. The vertical axis represents channel capacity and the horizontal axis represents reception SNR in the radio terminal 200. Here, the total transmission power is set to be the same regardless of whether the number of transmitting antennas is four or two. The radio terminal 200 moves at a speed of 3 km/h.

The case where the number of transmitting antennas is four is superior in characteristics to the case where the number of transmitting antennas is two due to the transmission diversity effect. From this result, transmitting antenna weight control based on the PMI can be judged to be effective in a low speed situation. Moreover, the case where the distance is set to 4λ and the case where the distance is set to 10λ show similar performances.

Figure 8:
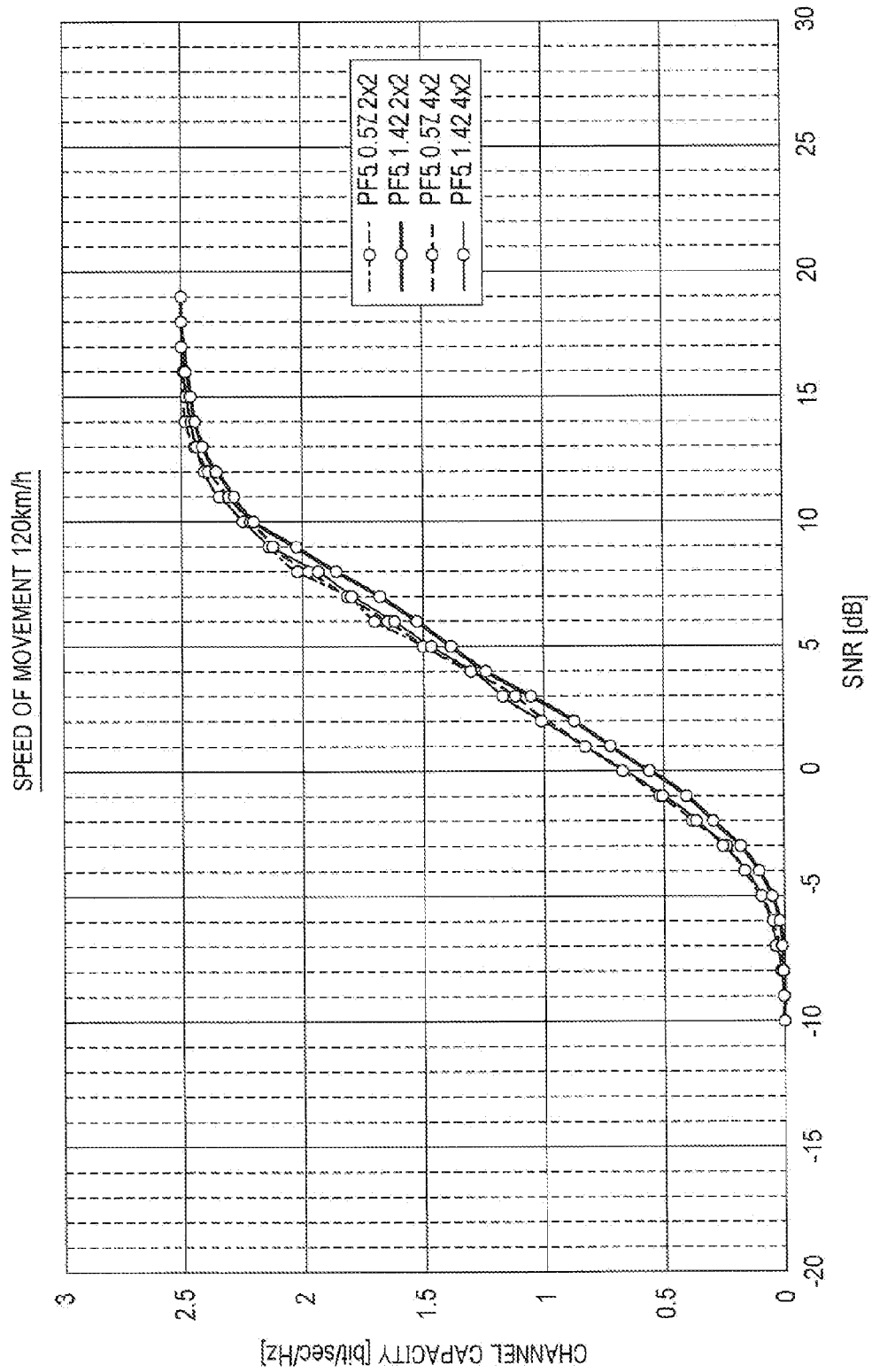
FIG. 8 is a (second) diagram for explaining the advantageous effect which the first embodiment of the present invention provides.

FIG. 8 shows a result in a case using the conditions in FIG. 7 except that the radio terminal 200 moves at a speed of 120 km/h. The performances are similar regardless of the number of transmitting antennas. This indicates that transmission diversity by transmitting antenna weight is not effective in a situation with severe transmission channel characteristics. The performances are similar regardless of the antenna distance.

Figure 9:
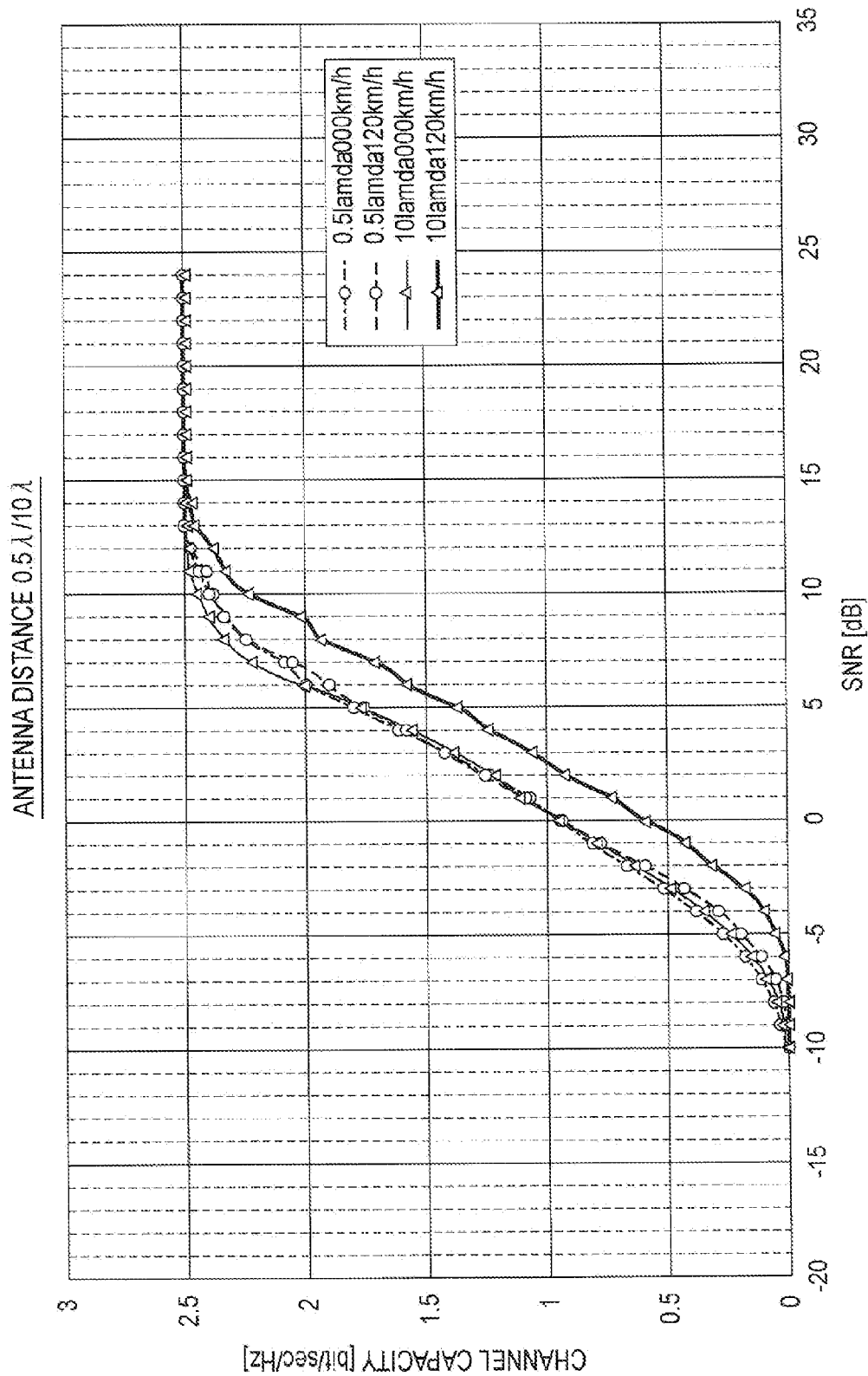
FIG. 9 is a (third) diagram for explaining the advantageous effect which the first embodiment of the present invention provides.

FIG. 9 shows a result of comparing a case where the antenna distance is 0.5λ and a case where the antenna distance is 10λ in the 2×2 antenna configuration. It has been known that the beam forming effect becomes eminent when the antenna distance is 1λ or shorter. In the case of FIG. 9 too, the configurations with the antenna distance of 1λ or shorter are found to be able to ensure a stable communication quality regardless of the moving speed of the radio terminal 200.

All things considered, also in a MIMO communication scheme, communication stream transmission less susceptible to transmission channel fluctuation can be implemented with an antenna configuration providing a high antenna correlation if the number of communication streams is one. As a matter of course, in multiple communication stream transmission where the rank is 2 or more, fine multiple communication paths can be formed by selecting an antenna configuration providing a low antenna correlation.

(6) Operation and Effect

As described above, in the case where the radio communication unit 120 transmits only one communication stream at a time, that is, when the communication quality degrades below a predetermined threshold, the transmitting antenna unit 130 selects the transmitting antennas 132 and 133 between which the antenna distance is the shortest from among the transmitting antennas 131 to 134. The radio communication unit 120 transmits a communication stream through the transmitting antennas 132 and 133 selected by the antenna selector 142.

Hence, by increasing the correlation between transmitting antennas after the communication quality has degraded below the predetermined threshold, the beam forming effect rather than the diversity effect becomes higher. Thus, the communication quality can be improved. Accordingly, with the radio base station 100 according to the present embodiment, faster and stable communication can be maintained even when the communication quality degrades below a predetermined threshold in a MIMO communication system.

In addition, the radio base station 100 according to the present embodiment can ensure a sufficient communication performance even when the fluctuation in the radio propagation path characteristics in a closed-loop MIMO communication system is large. Specifically, stable MIMO information transmission is possible even in a situation where the radio propagation path characteristics largely fluctuate due to, for example, high speed movement of the radio terminal 200. Moreover, equivalent communication quality can be provided regardless of the moving speed, that is, either in a high or low speed situation.

In the first embodiment, the beam forming effect can be increased because the distance between the transmitting antennas 132 and 133, which are selected if the communication quality degrades below the predetermined threshold, is not longer than 1λ.

In the first embodiment, the antenna weight determination unit 143 determines the transmitting antenna weight for weighting the communication stream for each of the transmitting antennas 131 to 134. The transmitting antenna weight is determined for each of the transmitting antennas such that the communication quality would be improved. Accordingly, in the case where the communication quality degrades below the predetermined threshold, the directivity can be directed to the radio terminal 200. Thus, an even higher beam forming effect can be provided.

Second Embodiment

Transmitting antenna configurations different from that in the first embodiment are described below in a second and a third embodiments. In the second and the third embodiments, differences from the first embodiment are described and overlapping descriptions are omitted.

FIG. 10(*a*) is a block diagram showing configurations of a radio communication unit 120A and a transmitting antenna unit 130A. The controller 140 is not illustrated because the configuration thereof is similar to that in the first embodiment.

The transmitting antenna unit 130A is different from that in the first embodiment in that an auxiliary transmitting antenna 135 is included therein. The auxiliary transmitting antenna 135 is not used for communication stream transmission until the communication quality degrades below a predetermined threshold. In addition, the radio communication unit 120A includes a radio signal converter 126 connected between the auxiliary transmitting antenna 135 and the data distributor 121.

As illustrated in FIGS. 10(a) and 10(b), a distance d4 between the auxiliary transmitting antenna 135 and the transmitting antenna 134 (specific transmitting antenna) neighboring thereto is not longer than 1λ. Meanwhile, each of the distances (the distance d1, the distance d2, and the distance d3) between neighboring ones of the transmitting antennas 131 to 135 except for the auxiliary transmitting antenna 135 (the transmitting antennas 131 to 134) is longer than 1λ and is, for example, about 4λ.

In the second embodiment, the antenna selector 142 selects the auxiliary transmitting antenna 135 and the transmitting antenna 134 for the single communication stream transmission (when the communication quality degrades below the predetermined threshold). Accordingly, as in the first embodiment, faster and stable communication can be maintained even when the communication quality degrades below the predetermined threshold.

The antenna selector 142 selects the transmitting antennas (the transmitting antennas 131 to 134) other than the auxiliary transmitting antenna 135 for the multiple communication stream transmission. A high diversity effect can be provided in the second embodiment because each of the distances between the neighboring ones of the transmitting antennas 131 to 134 is about 4λ.

Third Embodiment

FIG. 11(a) is a block diagram showing configurations of a radio communication unit 120B and a transmitting antenna unit 130B according to the third embodiment. The controller 140 is not illustrated because the configuration thereof is similar to that in the first embodiment.

The transmitting antenna unit 130B is different from that in the first embodiment in that two auxiliary transmitting antennas 135 and 136 are included therein. The auxiliary transmitting antennas 135 and 136 are not used for communication stream transmission until the communication quality degrades below a predetermined threshold. In addition, the radio communication unit 120B includes the radio signal converter 126 connected between the auxiliary transmitting antenna 135 and the data distributor 121 and a radio signal converter 127 connected between the auxiliary transmitting antenna 136 and the data distributor 121.

As illustrated in FIGS. 11(a) and 11(b), a distance d5 between the auxiliary transmitting antennas 135 and 136 is not longer than 1λ. Each of the distances (the distance d1, the distance d2, and the distance d3) between neighboring ones of the transmitting antennas 131 to 136 except for the auxiliary transmitting antennas 135 and 136 (the transmitting antennas 131 to 134) and a distance d4 between the transmitting antenna 134 and the auxiliary transmitting antenna 135 is longer than 1λ and is, for example, about 4λ.

In the third embodiment, the antenna selector 142 selects the auxiliary transmitting antennas 135 and 136 for the single communication stream transmission (when the communication quality degrades below the predetermined threshold). Accordingly, as in the first embodiment, faster and stable communication can be maintained even when the communication quality degrades below the predetermined threshold.

The antenna selector 142 selects the transmitting antennas (the transmitting antennas 131 to 134) other than the auxiliary transmitting antennas 135 and 136 for the multiple communication stream transmission. As in the second embodiment, a high diversity effect can be provided because each of the distances between the neighboring ones of the transmitting antennas 131 to 134 is about 4λ.

Other Embodiments

As described above, the details of the present invention have been disclosed by using the embodiments of the present invention. However, it should not be understood that the description and drawings which constitute part of this disclosure limit the present invention. From this disclosure, various alternative embodiments will be easily found by those skilled in the art.

For example, the descriptions are given in the embodiments of the closed-loop MIMO communication scheme using feedbacks. In addition, if time division duplex (TDD) scheme is adapted, the communication quality can be estimated on the transmitter side due to the reversible nature of the propagation path. Therefore, the present invention can be applied to a closed-loop MIMO scheme not using feedbacks.

Moreover, in the embodiments, the descriptions are mainly given of the communication in the downlink direction. However, the present invention is also applicable to the communication in the uplink direction as a matter of course.

Furthermore, in the embodiments, the descriptions are given mainly of the 4×2 antenna configuration. However, the antenna configuration is not limited thereto and a larger number of antennas may be provided or only a single antenna (receiving antenna) may be provided on the receiver side.

In the embodiments, the transmitting antennas are linearly arranged (linear arrangement). However, the transmitting antennas may be arranged to form a semicircular or ring shape. Still, a configuration with three or more antennas in linear arrangement is recommended for a radio communication system in which multi-antenna communication is set as default. Thus, the linear arrangement is preferable.

As described above, the present invention naturally includes various embodiments which are not described herein. Accordingly, the technical scope of the present invention should be determined only by the matters to define the invention in the scope of claims regarded as appropriate based on the description. The entire content of Japanese Patent Application Publication No. 2008-169628 (filed on Jun. 27, 2008) is incorporated herein by reference.

INDUSTRIAL APPLICABILITY

As described above, the radio communication device and the radio communication method according to the present invention allows faster and stable communication to be maintained in a multiple input multiple output radio communication system even in a case where the communication quality degrades below a predetermined threshold, and thus are advantageously used in a field of radio communication such as mobile communication.

The invention claimed is:

1. A radio communication device that includes a radio communication unit transmitting simultaneously a plurality of communication data series using a same frequency band to a receiving device through a transmitting antenna unit including a plurality of transmitting antennas, comprising:
an antenna selector configured to perform antenna selection processing when a communication quality degrades below a predetermined threshold in a radio communication channel between the radio communication device and the receiving device receiving simultaneously the plurality of communication data series and separating the plurality of communication data series into individual communication data series, the antenna selection processing performed by selecting, from among the plurality of transmitting antennas forming the transmitting antenna unit, such transmitting antennas that a distance between the transmitting antennas is shorter than before the communication quality degrades below the predetermined threshold, wherein the radio communication unit transmits the communication data series through the transmitting antennas selected by the antenna selector, the transmitting antenna unit includes a plurality of short transmitting antennas arranged with a distance therebetween not longer than a predetermined wavelength corresponding to the frequency band, among the plurality of transmitting antennas forming the transmitting antenna unit, all of a different transmitting antennas different from the plurality of short transmitting antennas have a longer distance therebetween than the predetermined wavelength, and all of the different transmitting antennas different from the plurality of short transmitting antennas have a longer distance to the short distance antenna group than the predetermined wavelength, and the antenna selector selects the short distance antenna group when the communication quality degrades below the predetermined threshold.

2. The radio communication device according to claim 1, wherein the antenna selector determines the distance between the transmitting antennas of the plurality of transmitting antennas forming the transmitting antenna unit, in such a way that the distance widens a region where a predetermined field strength is obtained at a position of the receiving device, and the antenna selector performs the antenna selection processing on the basis of the determined distance between the transmitting antennas.

3. The radio communication device according to claim 1, wherein when the communication quality degrades below the predetermined threshold, the antenna selector selects, from among the plurality of transmitting antennas forming the transmitting antenna unit, the transmitting antennas such that the distance between the transmitting antennas is not longer than the predetermined wavelength.

4. The radio communication device according to claim 3, wherein the antenna selector selects the transmitting antennas with which the distance between the transmitting antennas is not longer than $1\lambda$ where the wavelength of the frequency band is defined as $1\lambda$.

5. The radio communication device according to claim 3, wherein the plurality of transmitting antennas forming the transmitting antenna unit includes:
  an auxiliary transmitting antenna that is not used for the transmission of the communication data series until the communication quality is determined to have degraded below the predetermined threshold; and
  a specific transmitting antenna whose distance to the auxiliary transmitting antenna is not longer than the predetermined wavelength, among the plurality of transmitting antennas forming the transmitting antenna unit, the transmitting antennas except for the auxiliary transmitting antenna has a longer distance therebetween than the predetermined wavelength, and the antenna selector selects the auxiliary transmitting antenna and the specific transmitting antenna when the communication quality degrades below the predetermined threshold.

6. The radio communication device according to claim 3, wherein the plurality of transmitting antennas forming the transmitting antenna unit include a plurality of auxiliary transmitting antennas that are not used for the transmission of the communication data series until the communication quality is determined to have degraded below the predetermined threshold, a distance between the plurality of auxiliary transmitting antennas is not longer than the predetermined wavelength, among the plurality of transmitting antennas forming the transmitting antenna unit, transmitting antennas different from the auxiliary transmitting antennas have a longer distance therebetween than the predetermined wavelength and each have a longer distance to each of the auxiliary transmitting antennas than the predetermined wavelength, and the antenna selector selects the plurality of auxiliary transmitting antennas when the communication quality degrades below the predetermined threshold.

7. The radio communication device according to claim 1, wherein the antenna selector performs the antenna selection processing when the radio communication unit is transmitting the communication data series one at a time.

8. The radio communication device according to claim 7, further comprising:

a weight determination unit configured to determine a transmitting antenna weight for each of the plurality of transmitting antennas, the transmitting antenna weight assigned to the communication data series, wherein the weight determination unit determines the transmitting antenna weight for each of the plurality of transmitting antennas such that the communication quality is improved.

9. A radio communication device that includes a radio communication unit capable of transmitting simultaneously a plurality of communication data series using a same frequency band to a receiving device through a transmitting antenna unit including a plurality of transmitting antennas, comprising:

an antenna selector configured to perform antenna selection processing when the number of communication data series transmitted from the radio communication unit to the receiving device decreases to a predetermined number or below, the antenna selection processing performed by selecting, from the plurality of transmitting antennas forming the transmitting antenna unit, such transmitting antennas that a distance between the transmitting antennas is shorter than before the number of communication data series decreases to the predetermined number or below, the receiving device being capable of receiving simultaneously the plurality of communication data series and separating the plurality of communication data series into individual communication data series, wherein the radio communication unit transmits the communication data series through the transmitting antennas selected by the antenna selector, the transmitting antenna unit includes a plurality of short transmitting antennas arranged with a distance therebetween not longer than a predetermined wavelength corresponding to the frequency band, among the plurality of transmitting antennas forming the transmitting antenna unit, all of a different transmitting antennas different from the plurality of short transmitting antennas have a longer distance therebetween than the predetermined wavelength, and all of the different transmitting antennas different from the plurality of short transmitting antennas have a longer distance to the short distance antenna group than the predetermined wavelength, and the antenna selector selects the short distance antenna group when the communication quality degrades below the predetermined threshold.

10. A radio communication method that uses a radio communication unit transmitting simultaneously a plurality of communication data series using a same frequency band to a receiving device through a transmitting antenna unit including a plurality of transmitting antennas, comprising the steps of:

when a communication quality degrades below a predetermined threshold in a radio communication channel between the radio communication unit and the receiving device receiving simultaneously the plurality of communication data series and separating the plurality of communication data series into individual communication data series, selecting, from among the plurality of transmitting antennas forming the transmitting antenna unit, such transmitting antennas that a distance between the transmitting antennas is shorter than before the communication quality degrades below the predetermined threshold; and transmitting, from the radio communication unit, the communication data series through the transmitting antennas selected by the step of selecting, wherein the transmitting antenna unit includes a plurality of short transmitting antennas arranged with a distance therebetween not longer than a predetermined wavelength corresponding to the frequency band, among the plurality of transmitting antennas forming the transmitting antenna unit, all of a different transmitting antennas different from the plurality of short transmitting antennas have a longer distance therebetween than the predetermined wavelength, and all of the different transmitting antennas different from the plurality of short transmitting antennas have a longer distance to the short distance antenna group than the predetermined wavelength, and selecting, by the antenna selector, the short distance antenna group when the communication quality degrades below the predetermined threshold.

11. A radio communication method that uses a radio communication unit capable of transmitting simultaneously a plurality of communication data series using a same frequency band to a receiving device through a transmitting antenna unit including a plurality of transmitting antennas, comprising the steps of:

when the number of communication data series transmitted from the radio communication unit to the receiving device decreases to a predetermined number or below, selecting, from among the plurality of transmitting antennas forming the transmitting antenna unit, such transmitting antennas that a distance between the transmitting antennas is shorter than before the number of communication data series decreases to the predetermined number or below, the receiving device being capable of receiving simultaneously the plurality of communication data series and separating the plurality of communication data series into individual communication data series; and transmitting, from the radio communication unit, the communication data series through the transmitting antennas selected by the step of selecting, wherein the transmitting antenna unit includes a plurality of short transmitting antennas arranged with a distance therebetween not longer than a predetermined wavelength corresponding to the frequency band, among the plurality of transmitting antennas forming the transmitting antenna unit, all of a different transmitting antennas different from the plurality of short transmitting antennas have a longer distance therebetween than the predetermined wavelength, and all of the different transmitting antennas different from the plurality of short transmitting antennas have a longer distance to the short distance antenna group than the predetermined wavelength, and selecting, by the antenna selector, the short distance antenna group when the communication quality degrades below the predetermined threshold.

\* \* \* \* \*